United States Patent [19]

Khaund

[11] Patent Number: 4,668,645

[45] Date of Patent: May 26, 1987

[54] SINTERED LOW DENSITY GAS AND OIL WELL PROPPANTS FROM A LOW COST UNBLENDED CLAY MATERIAL OF SELECTED COMPOSITION

[76] Inventor: Arup Khaund, 4204 Brookdale Drive, Niagara Falls, Ontario, Canada, L2H 2B5

[21] Appl. No.: 818,058

[22] Filed: Jan. 10, 1986

Related U.S. Application Data

[63] Continuation of Ser. No. 628,015, Jul. 5, 1984, abandoned.

[51] Int. Cl.$^4$ .............................................. C04B 35/10
[52] U.S. Cl. ..................................... 501/127; 501/33; 501/141; 166/280
[58] Field of Search .......................... 501/141, 127, 33; 166/280

[56] References Cited

U.S. PATENT DOCUMENTS

| | | | |
|---|---|---|---|
| 1,862,974 | 6/1929 | McDougal | 501/141 |
| 2,950,247 | 8/1960 | McGuire, Jr. et al. | 252/8.55 |
| 3,079,243 | 2/1963 | Ueltz | 51/298 |
| 3,399,727 | 9/1968 | Graham et al. | |
| 3,491,492 | 1/1970 | Ueltz | 51/309 |
| 3,497,008 | 2/1970 | Graham et al. | 166/280 |
| 3,642,505 | 2/1972 | Bakker | 106/65 |
| 3,758,318 | 9/1973 | Farris et al. | 501/128 |
| 3,890,072 | 6/1975 | Barks | 425/6 |
| 3,976,138 | 8/1976 | Colpoys, Jr. et al. | 166/280 |
| 4,068,718 | 1/1978 | Cooke, Jr. et al. | 166/280 |
| 4,072,193 | 2/1978 | Sarda | 166/280 |
| 4,427,068 | 1/1984 | Fitzgibbon | 166/280 |
| 4,440,866 | 4/1984 | Lunghofer | 501/127 |
| 4,522,731 | 6/1985 | Lunghofer | |
| 4,547,468 | 10/1985 | Jones et al. | 501/33 OR |
| 4,623,630 | 11/1986 | Fitzgibbon | 501/127 OR |

FOREIGN PATENT DOCUMENTS

| | | | |
|---|---|---|---|
| 101855A | 3/1984 | European Pat. Off. | |
| 0116369 | 8/1984 | European Pat. Off. | 501/82 |
| 7940365 | 11/1979 | United Kingdom | 166/280 |

OTHER PUBLICATIONS

U.S. Department of Energy, "Enhanced Oil Recovery & Improved Drilling Technology", vol. 29, DOE/BETC-821, Progress Review, Dec. 31, 1981, pp. 124–126.
U.S. Department of Energy, "Light Weight Proppants for Deep Gas Well Stimulation", Cutler et al., DOE/BC 10038-22, Fossil Energy, Apr. 1982, pp. 1–46.
U.S. Department of Energy, Jones et al., "Light Weight Proppants for Deep Gas Well Stimulation", DE-AC 19-7913C10038, Jun. 1980, pp. 1–45.
U.S. Depart of Energy, Cutler et al., "Light Weight Proppants for Deep Gas Well Stimulation", DEAC1979BC10038, Jan. 1983, pp. 1–104.
U.S. Department of Energy, "Enhanced Oil Recovery & Improved Drilling Technology", vol. 22, DOE/BETC-80/20, Progress Review, Mar. 31, 1980, pp. 127–128.
U.S. Department of Energy, "Enhanced Oil Recovery & Improved Drilling Technology", vol. 24, DOE/BETC-80/4, Progress Review, Sep. 30, 1980, pp. 151–152.
U.S. Department of Energy "Enhanced Oil Recovery & Improved Drilling Techology", vol. 26, DOE/BETC-81/2, Progress Review, Mar. 31, 1980, pp. 129–130.
U.S. Department of Energy," Enhanced Oil Recovery & Improved Drilling Technology", vol. 27, DOE/BETC-81/3, Progress Review, Jun. 30, 1981, pp. 115–117.
"Coors Mullite Proppant" Coors Porcelain Company Bulletin No. 208-5, Feb. 26, 1967.
Cutler et al., "Comparison of the Fractive Conductivity of Commercially Available and Experimental Proppants at Intermediate and High Closure Stresses, 1983 SPE/DOE Symposium on Low Permeability at Denver, Mar. 14–16, 1983, pp. 305–312.
Cutler et al., "New Proppants for Deep Gas Well Stimulation", 1981, SPE/DOE Low Permeability Symposium in Denver, May 27–29, 1981, pp. 379–385.

*Primary Examiner*—William R. Dixon, Jr.
*Assistant Examiner*—Karl Group
*Attorney, Agent, or Firm*—Rufus M. Franklin

[57] ABSTRACT

A solid granular propping agent is disclosed having a Krumbein number of greater than 0.8, and containing granules between 0.2 and 1.7 mm in diameter, said granules being made from an unblended clay containing from 16 to 19% of silica, less than 0.35% alkali and alkaline earth metal oxides, and being fired at a time and temperature whereby the product contains a major mullite phase and a minor alpha alumina phase.

2 Claims, No Drawings

SINTERED LOW DENSITY GAS AND OIL WELL PROPPANTS FROM A LOW COST UNBLENDED CLAY MATERIAL OF SELECTED COMPOSITION

This is a continuation of U.S. appln. Ser. No. 06/628,015, filed July 5, 1984, now abandoned.

FIELD OF THE INVENTION

The invention relates to solid granular proppants for oil and gas wells.

BACKGROUND OF THE INVENTION

Since the late 1940's when hydraulic fracturing of the formation was first practised, it has been found necessary to inject solid granular propping agents into such formations to prevent closure of the fractures. Sand (flint) was apparently the first such solid propping agent to be employed. The McGuire patent, U.S. Pat. No. 2,950,247 suggests the use of aluminum oxide spheres as proppant agents. Bark's U.S. Pat. No. 3,890,072 suggests the use of sintered bauxite spheres for oil well proppants. Cooke's patent, U.S. Pat. No. 4,068,718 teaches the use of sintered bauxite particles made according to the teaching of U.S. Pat. Nos. 3,079,243 or 3,421,492 to Ueltz for oil well proppants.

Cooke's U.S. Pat. No. 4,068,718 referred to above, requires a density of at least 3.4 g/cc in the proppant in order to provide sufficient compressive strength. However, the sintered bauxite proppant described in the prior art, though excellent in permeability (measured by a standardized permeability test—see Cooke U.S. Pat. No. 4,068,718) and in chemical resistance (measured by a standardized API acid solubility test), are not cost effective for intermediate depth wells of pressures between 5,000 to 10,000 psi because of higher cost of bauxite as raw materials. Further, a low density proppant with density less than 3.4 g/cc is easier to pump into the well and may be carried more readily into the cracks in the formation than a more dense proppant. A low density proppant will also additionally benefit the user as lower amounts of proppant will be required to fill a given volume of the well formation. Colpoy's U.S. Pat. No. 3,976,138 suggests "alumina" proppants of a wide range density and alumina content but contains no teachings of how the pellets are made and what kind of raw materials were used for the invention and also shows the results only for material with a density of 3.4 g/cc or greater. Fitzgibbon, U.S. Pat. No. 4,427,068 describes a method of manufacturing a lower density (less than 3.4 g/cc) proppant by blending diaspore, barley and flint clays with varying amounts of higher cost bauxite raw material. Results in the Fitzgibbon U.S. Pat. No. 4,427,068 suggest that as the amount of bauxite is decreased the proppant permeability (i.e. quality) dimishes and to keep the reduction of permeability to about 50%, when the closure stress is increased from 2,000 psi to 10,000 psi the amount of bauxite required to be blended to the diaspore clay is about 40%. This increases the cost of the raw materials substantially.

Further the acid solubility (measured by a standardized API method) of the proppants made according to Fitzgibbon U.S. Pat. No. 4,427,068 ranged between 4.86 to 7.4% which is approximately 50 to 150% higher than that for sintered bauxite proppants described in Cooke's U.S. Pat. No. 4,068,718 and are now commercially available. The need for blending bauxite to various clays in Fitzgibbon U.S. Pat. No. 4,427,068 also adds additional processing steps and the complexity of co-milling of the two various raw materials of different chemical characteristics to a fine size in a manufacturing process. All the additional processing steps and use of bauxite blend in Fitzgibbon U.S. Pat. No. 4,427,068 add cost to the manufacture of the proppant and the cost/productivity justification of using a low cost lower density proppant material in intermediate depth gas and oil wells (5,000 feet to 15,000 feet) may be greatly reduced.

Bakker U.S. Pat. No. 3,642,505 teaches making mullite aggregate for refractory purposes, by grinding a siliceous bauxite (13 to 14% $SiO_2$), forming pellets under pressure, then calcining, and subsequently firing the pellets to at least 1535° C.

The proppants after firing should be generally spherical (Krumbein number of at least 0.8) and have a size range of from 12, U.S. Standard Sieve Size, to 70 U.S. Standard Sieve size. The preferred size for most applications is through mesh 20 on mesh 40. U.S. Standard Sieves have mesh openings as follows:

| Size | Inches | Millimeters |
| --- | --- | --- |
| 12 | 0.0661 | 1.68 |
| 20 | 0.0331 | 0.841 |
| 25 | 0.0278 | 0.707 |
| 30 | 0.0234 | 0.595 |
| 40 | 0.0165 | 0.420 |
| 70 | 0.0083 | 0.210 |

BRIEF DESCRIPTION OF THE INVENTION

A low cost Arkansas bauxite clay selectively mined with a silicon (calculated as $SiO_2$) content between 16-19% (on an anhydrous basis) and a total amount of alkali and alkaline earth oxide (i.e. CaO, $Na_2O$, $K_2O$) impurities not exceeding 0.35% is discovered to be useful directly, without the addition of any bauxite (unlike Fitzgibbon U.S. Pat. No. 4,427,068) or reactive alumina trihydrate, to produce an economical, low density (3.0–3.25 g/cc), proppant with sufficient compressive strength and excellent chemical resistance properties (superior to that given in U.S. Pat. No. 4,427,068) useful for gas and oil wells with depths ranging in excess of 5,000 feet to about 15,000 feet. The low alkali and alkaline earth impurity content of the solid clay together with the selected mining of the clay in the 16–19% range in $SiO_2$ content allows one to achieve, after sintering at a temperature of about 1500° C., an appropriate phase assemblage of mullite and alpha-$Al_2O_3$, keeping the formation of glassy phase to a minimum and thereby producing a proppant product with sufficient compressive stress and excellent chemical resistance required for severe environment encountered in gas and oil well treatment. The particular clay raw materials consisted of gibbsite and approximately 70% of the total $SiO_2$ in a reactive alumina-silicate form with the remaining 30% of the total $SiO_2$ in a free quartz form.

It is found that if the total alkaline earth oxide impurities are greater than 0.35% in total, then the formation of glassy phase is extensive at the expense of mullite and alpha-$Al_2O_3$ phase, reducing permeability (or conductivity, which is permeability multiplied by fracture width) and acid resistance (measured by a standardized API method) of the proppant.

A typical chemical analysis of the clay and the preferred range of each of the constituents suitable for this invention is given in Table I. All chemical data in Table I are on an anhydrous basis.

TABLE I

| Clay Constituents | Typical | Preferred Range |
|---|---|---|
| $SiO_2$ | 17.10% | 16–19% |
| $Fe_2O_3$ | 6.13% | 7% |
| $TiO_2$ | 3.69% | 2–4% |
| MgO | 0.05% | 0.15% max. |
| Total Alkali and alkaline Earth Oxide | | |
| % CaO + % $Na_2O$ + % $K_2O$ | 0.29% | 0.35% max |
| $Al_2O_3$ (by difference) | 72.74% | 70–80% |

The above mentioned clay, after mining, is calcined at a temperature of about 1000° C. in a rotary calciner to drive off most of the moisture and chemical water usually present in such clay materials. The material is then fine milled to an average particle size of 10 microns or less (preferably to an average particle size of 5 microns or less). Although other known pelletization methods may be used, in the preferred method the milled clay, together with minor amounts of organic or inorganic binder for green strength is placed in an intensive mixer together with sufficient water for initiating the pelletizing process. After a period of mixing, additional dry milled clay powder is added and the pelletizing action is continued until spheres of the desired green sizes are formed. The pellets are then dried and sintered at 1400° C. to 1500° C. to produce the desired product. Except for the composition of the raw materials, the method employed in that disclosed in the published European Patent No. EP-101,855A. The finished product consists of substantially spherical ceramic particles having a density of less than 3.4 g/cc (preferably 3.0–3.25 g/cc) with sufficient compressive strength so that it does not lose more than 75% of its permeability (see Cooke U.S. Pat. No. 4,068,718) when measured on a standardized permeability test in 2% KCl solution at 200° F., while the applied closure stress is raised from 1,000 psi to 10,000 psi. The resultant product also has retained 50% of its permeability while the closure stress was raised from 2,000 psi to 10,000 psi when total alkali and alkaline earth oxide (i.e. % CaO, % $Na_2O$, % $K_2O$) impurities in the unblended bauxitic clay of the present invention were less than 0.35%. The similar retention of permeability of proppants of prior art U.S. Pat. No. 4,427,068 could only be achieved by the addition of as much as 40% bauxite to the diasporic clay. In addition the acid resistance of the proppants (measured by the standardized API Acid Solubility method) made by the present invention is about 50 to 150% better than those of the U.S. Pat. No. 4,427,068.

SPECIFIC EXAMPLES

Example I

A calcined Arkansas bauxitic clay with total alkaline earth oxide impurity content less than 0.35% was employed for this example. The clay was calcined at 1000° C. and then milled to an average particle size of below 10 microns. For pelletization, an Eirich DE 14 high intensity mixer (available from Maschinenfabric Gustav Eirich, Nordbaron, Federal Republic of Germany) was employed using a standard pin type mixing tool. The mix consisted of 1000 lbs. of milled Arkansas clay of the type given above and 32 pounds of corn starch. These ingredients were mixed dry at a low speed for about 15 seconds at which time about 300 lbs. of water was added. After the addition of the water, the mixing was switched to high speed for proper compaction of the clay mix. The high speed mix was continued for about 1½ minutes to 2 minutes at which time the mixing was switched to slow speed and about 400 pounds of the calcined milled bauxitic clay was added to the mix at the rate of 1 lb/sec. After the addition was completed, mixing was continued for about 10–15 seconds and thus formed green spherical pellets were dumped from the mixer, dried and fired at 1480° C. to 1500° C. for 45 minutes in a rotary kiln.

Example II

A calcined bauxitic clay with total alkali and alkaline earth oxide impurity content greater than 0.35% was employed for this example to illustrate the importance of total alkali and alkaline earth oxide impurities on the proppant quality with respect to their ability to retain permeability to at least 50% of the value at 2,000 psi closure stress when closure stress is raised to 10,000 psi, and also to the resistance to acid solubility. The clay was calcined at 1000° C. and then milled to an average particle size of less than 10 microns as for Example I. The pelletization of Example II was also carried out in a manner similar to that of Example I. The green formed pellets were dried and fired at 1480° C. to 1500° C. for 45 minutes in a rotary kiln.

The chemical analysis, permeability data in 2% KCl solution at 200° F. measured by a standardized permeability test (see Cooke's Pat. No. 4,068,718) and acid solubility values (measured by a standardized API method) for Examples I and II are given in Table II along with that of sample #2 from prior art U.S. Pat. No. 4,427,068 (sample #2 is the best example in this prior art with respect to decrease in permeability and acid solubility) for comparison. It is to be noted that in Table II, whereas absolute number for permeability may vary depending on the size range of the proppant tested, the decrease in permeability when the closure stress is increased from 2,000 psi to 10,000 psi do indicate the quality level attained in proppants.

The data in Table II shows that for Example I, where total alkali and alkaline earth oxide impurities were less than 0.35%, the proppant quality as measured by the drop in permeability values and acid solubility values are superior to Example II, where the total alkali earth oxide impurities exceeded 0.35%. In fact, the drop in permeability, when applied closure stress was raised from 2,000 psi to 10,000 psi is similar to that of sample #2 of prior art U.S. Pat. No. 4,427,068 where 40% bauxite had to be added to the Diasporic clay to get the same drop in permeability and thereby increasing costs and involving additional processing steps. In addition, the acid solubility values of Example I is about 75% better than that of sample #2 of U.S. Pat. No. 4,427,068. Furthermore the permeability of Example I at 10,000 psi with N less than 0.35% is about 88% better than that of Example II with N greater than 0.35% under the same testing conditions.

TABLE II

| % N = % CaO + % $Na_2O$ + % $K_2O$ on an anydrous basis. | | | |
|---|---|---|---|
| | Example I | Example II | Sample #2 (data from U.S. Pat. No. 4,427,068 |
| Composition: | 100% unblended | 100% unblended | 60% Diasporic Clay plus |

TABLE II-continued

% N = % CaO + % Na$_2$O + % K$_2$O on an anydrous basis.

| | Example I | Example II | Sample #2 (data from U.S. Pat. No. 4,427,068 |
|---|---|---|---|
| | clay with N <0.35% | clay with N >0.35% | 40% bauxite |
| % SiO$_2$ | 15.80 | 16.53 | 12.52 |
| % Fe$_2$O$_3$ | 7.05 | 6.58 | 2.36 |
| % N | 0.32 | 0.40 | |
| Spec. Gravity | 3.22 | 3.19 | 3.27 |
| Permeability (0.150" Frac. width) (Darcy) | | | |
| 2,000 psi | 593 | 421 | 225 |
| 4,000 psi | 553 | 379 | 193 |
| 6,000 psi | 489 | 309 | 163 |
| 8,000 psi | 388 | 229 | 138 |
| 10,000 psi | 300 | 160 | 113 |
| Decrease Permeability | | | |
| 2,000 psi to 10,000 psi | 49.41% | 62.0% | 49.77% |
| % Acid Solubility | 3.09 | 4.19 | 5.42 |

What is claimed is:

1. A solid granular propping agent having a Krumbein number of greater than 0.8, the diameter of the granules of said propping agent being between 0.2 and 1.7 mm, said granules being made from a mined bauxitic clay that has, on an anhydrous basis, the composition of from 16 to 19% silica, 70 to 80% alumina and less than 0.35% alkali and alkaline earth metal oxides and being fired at a temperature of between 1400° and 1500° C. and a time to form a propping agent containing a major mullite phase and a minor alpha alumina phase.

2. A method of making a granular proppant for oil and gas wells comprising selecting a mined bauxitic clay that is unblended with any other ore or alumina and that has, on an anhydrous basis, a silica content of from 16 to 19%, an alumina content from 70 to 80% and an alkali and alkaline earth metal oxide content of less than 0.35%, calcining said mined bauxitic clay to remove water, then milling the calcined bauxitic clay to a particular size of less than 10 microns, mixing the milled bauxitic clay with temporary binders and water in an intensive mixer to form spherical pellets, and firing said pellets at a temperature of from 1400° to 1500° C. to convert the calcined bauxitic clay to mullite and alpha alumina and to obtain a granular proppant having a Krumbein number of greater than 0.8, wherein said proppant granules are between 0.2 and 1.7 mm in diameter.

* * * * *